June 26, 1934.   A. A. OVERBURY   1,964,211
CALCULATING MACHINE
Filed Sept. 22, 1932   6 Sheets-Sheet 1
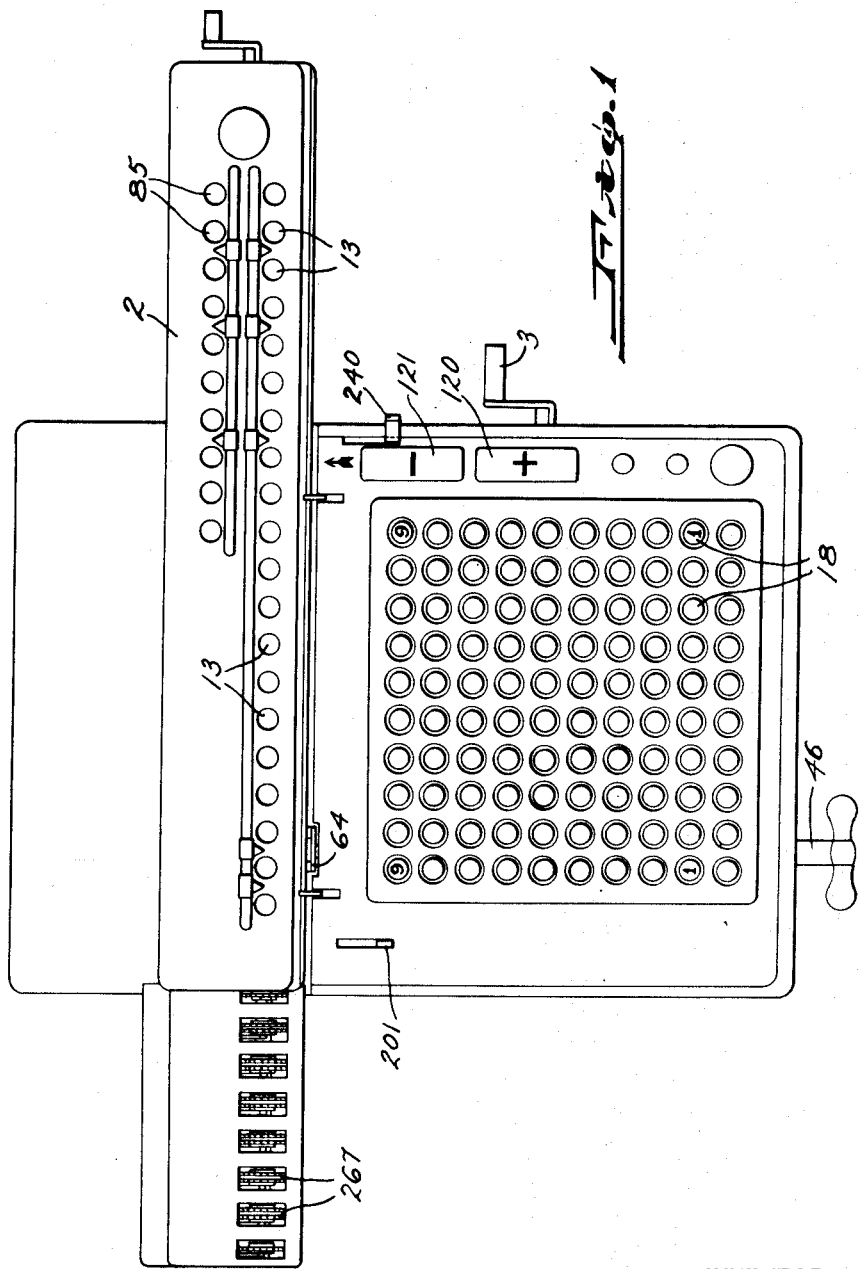
INVENTOR
Austin A. Overbury.
BY
Stuart Hilden. ATTORNEY

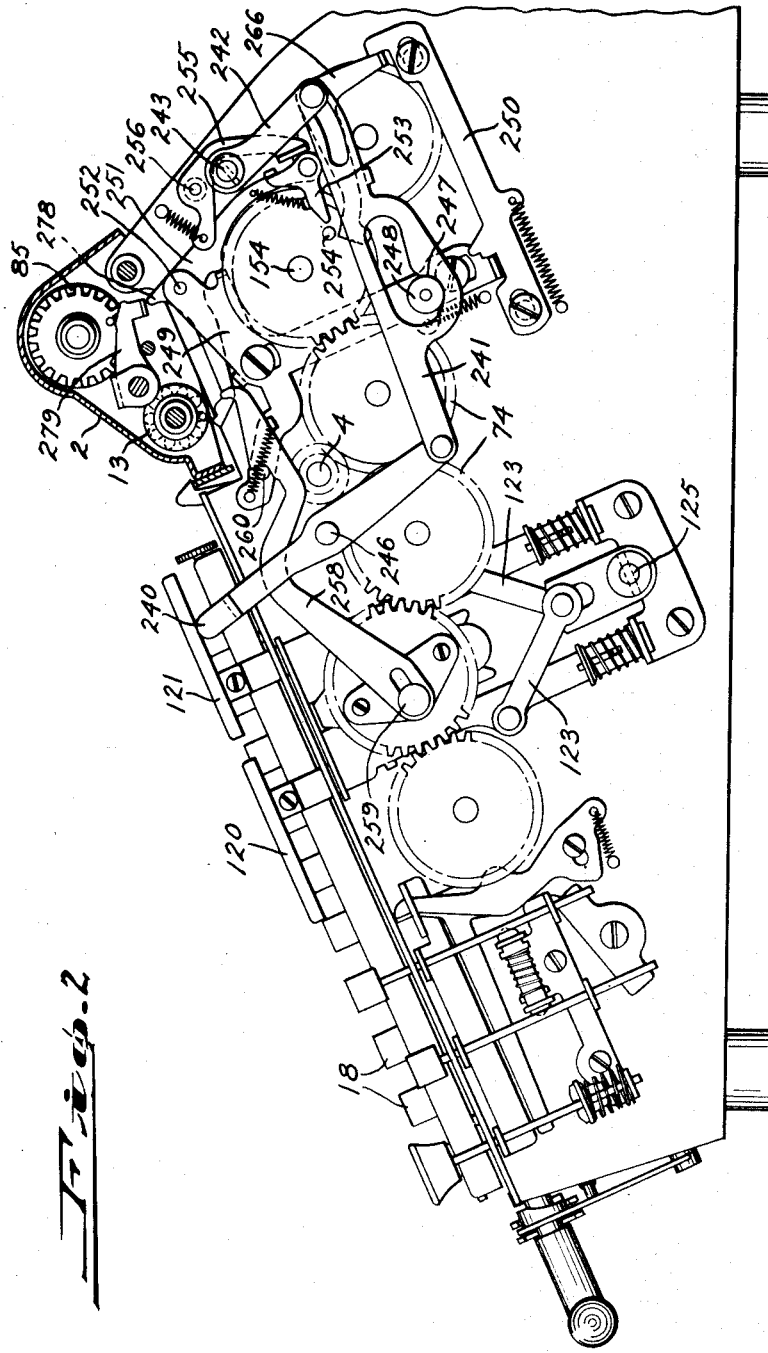

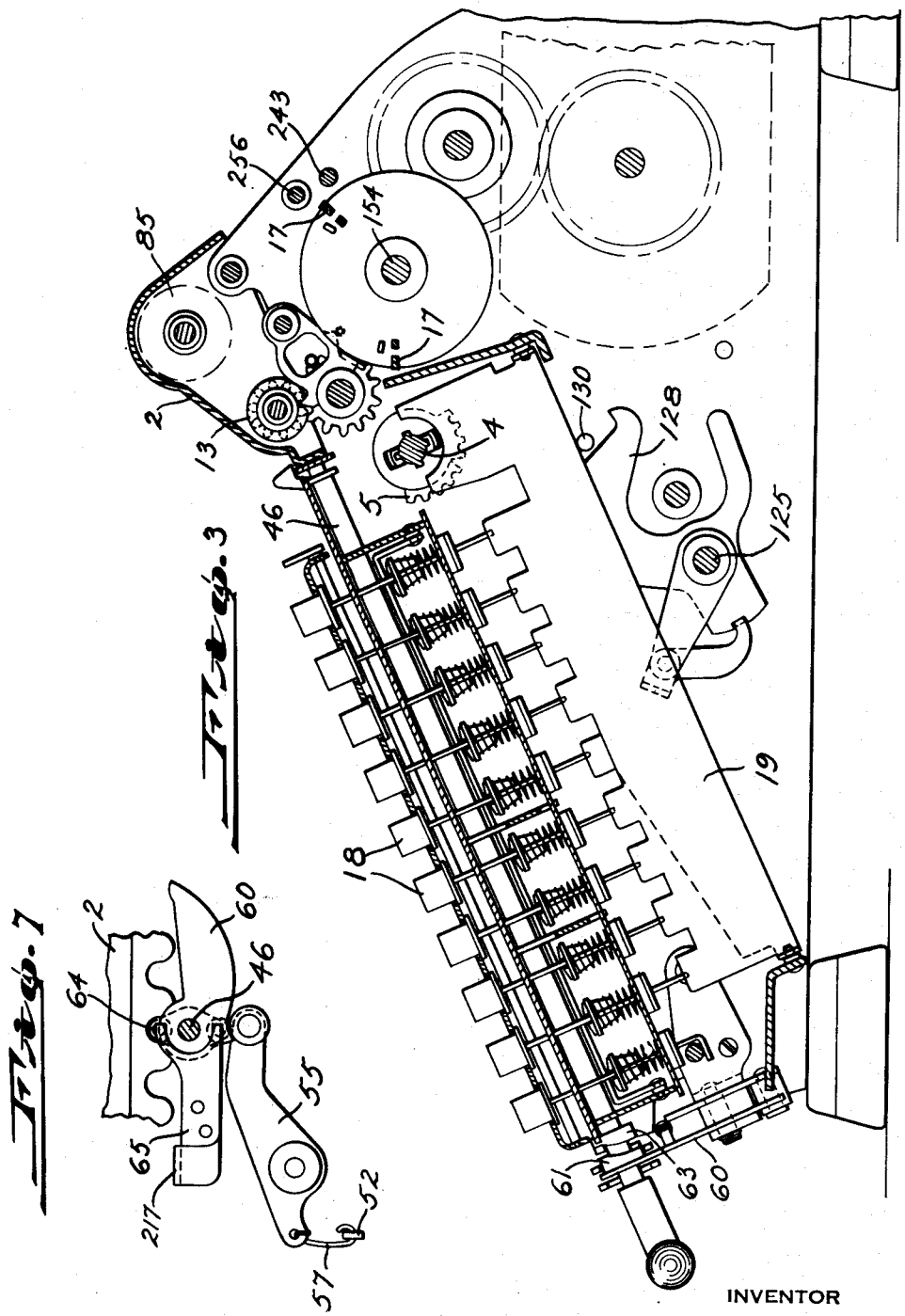

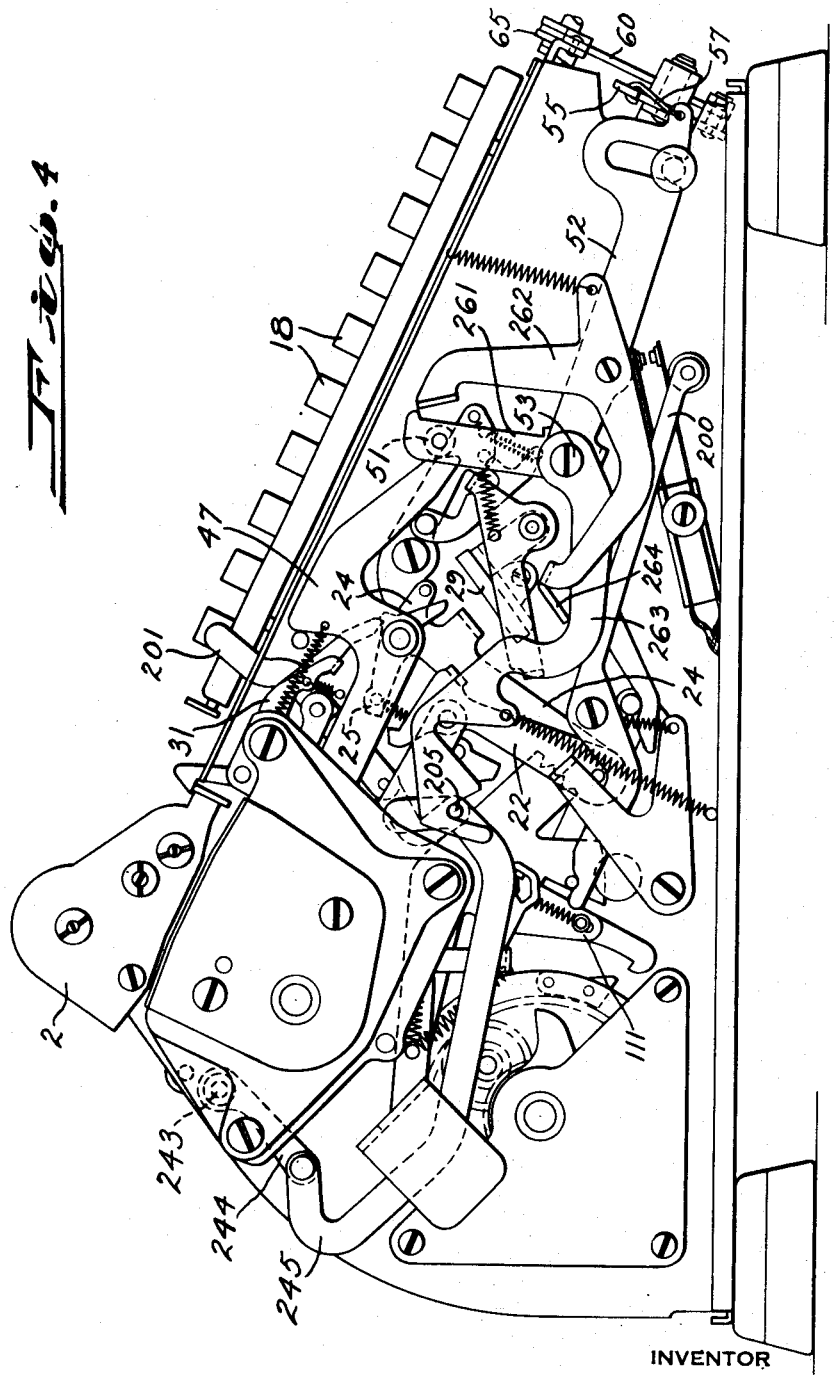

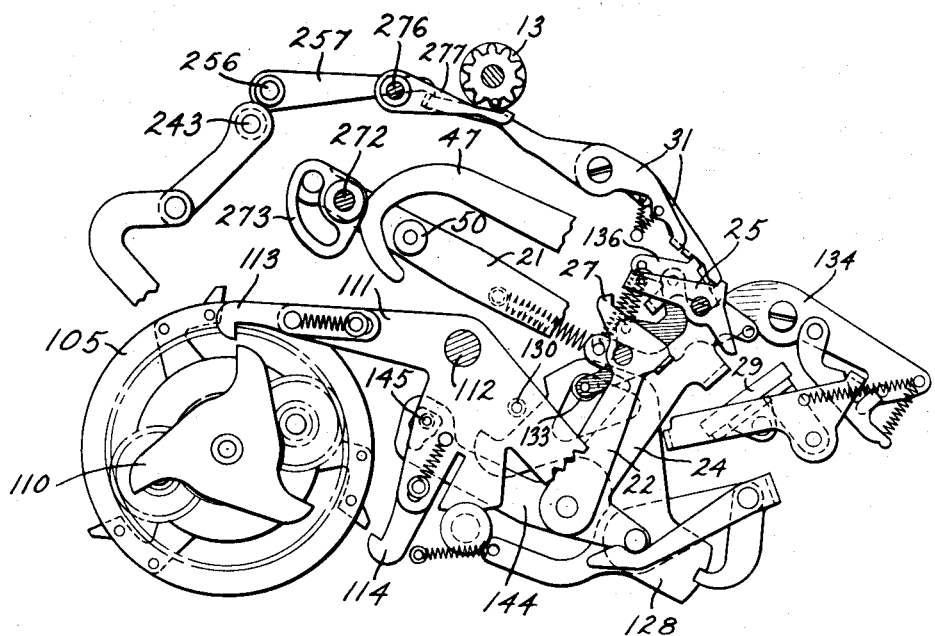
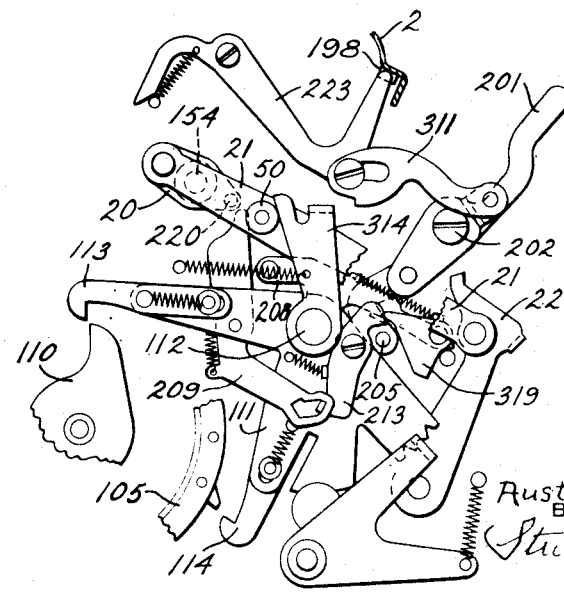

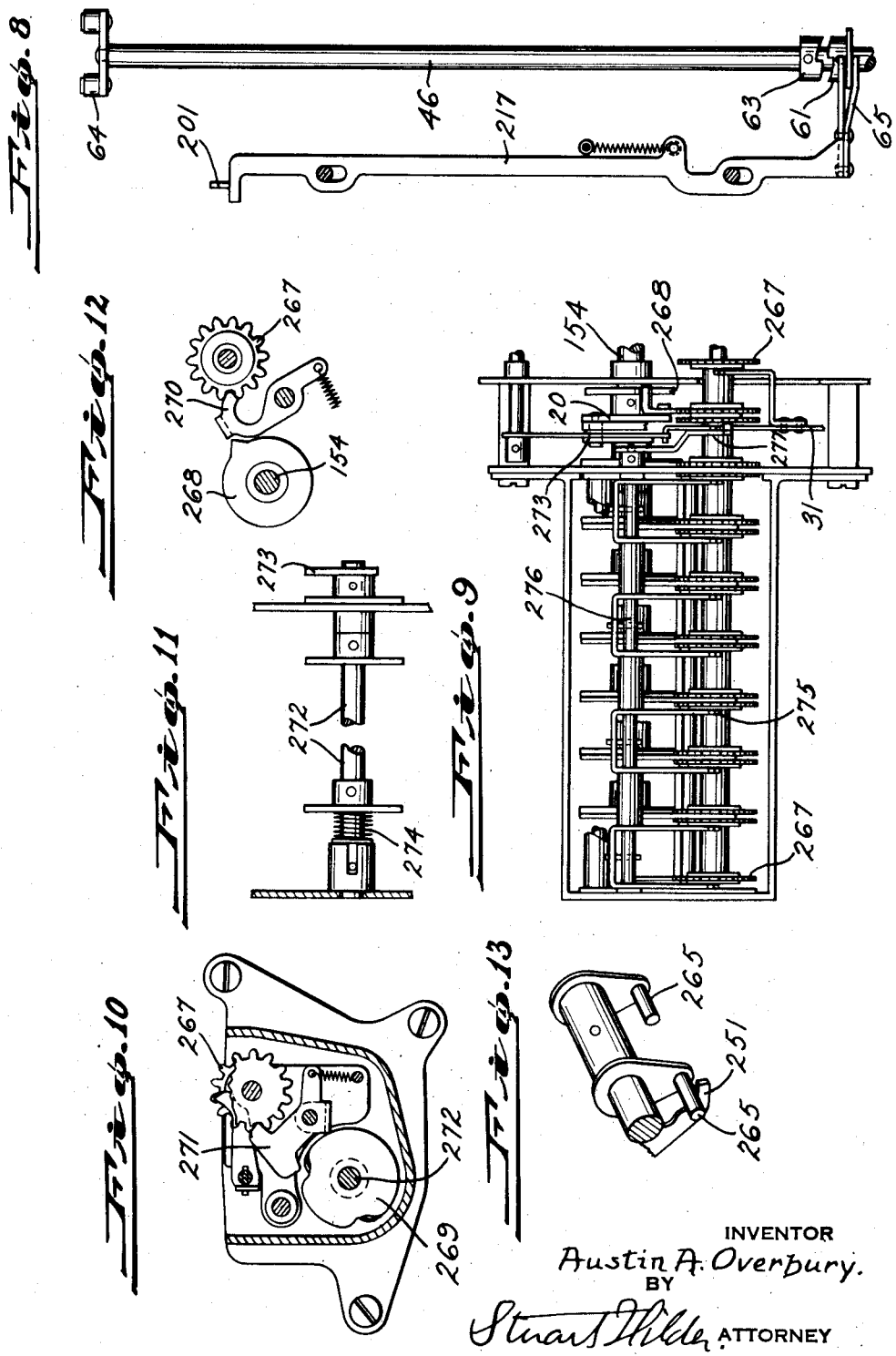

Patented June 26, 1934

1,964,211

UNITED STATES PATENT OFFICE

1,964,211

CALCULATING MACHINE

Austin A. Overbury, West Orange, N. J., assignor to Monroe Calculating Machine Company, Orange, N. J., a corporation of Delaware Application September 22, 1932, Serial No. 634,297

5 Claims. (Cl. 235—63)

The invention has relation to calculating machines and more particularly to means for registering the product of two completely set factors by the repeated addition method.

It has been proposed, heretofore, to provide means whereby an amount accumulated in the register of a calculating machine might be transferred therefrom to other selectively settable mechanism of the machine, in order to use such amount as a multiplier in a second or related calculation.

According to the present invention, the automatic multiplication mechanism facilitates the performance of a series of calculations of this nature, by controlling the multiplying operation directly from the main accumulating register, so that an amount registered therein may be used as a multiplier without the necessity of transfer to a different mechanism.

Various operations have heretofore been controlled from the accumulator register wheels of a calculating machine by utilizing an overcarry of the tens transfer mechanism thereof, but in the present case the consequent overrun and necessary corrective operation are dispensed with, and a considerable saving of time is thus effected.

The invention consists in the novel construction and combination of parts, as set forth in the appended claims.

In the preferred embodiment the invention is shown as applied to a Monroe calculating machine constructed in accordance with the disclosure of U. S. Patent 1,566,650, issued to George C. Chase on December 22, 1925. Other features of this embodiment are disclosed in U. S. Patent 1,845,863 issued to the same inventor on February 26, 1932.

In the accompanying drawings, illustrating the invention:

Fig. 1 is a plan view of a calculating machine embodying the present invention.

Fig. 2 is a right hand side elevation of the same with the casing removed.

Fig. 3 is an elevational section taken through the keyboard.

Fig. 4 is a left hand side elevation of the machine with casing removed.

Fig. 5 is a detail elevation of the clutch controlling means.

Fig. 6 is a similar view of cooperating mechanism for controlling plural order operations.

Fig. 7 is a detail front elevation of the carriage shifting mechanism.

Fig. 8 is a detail plan view of the same.

Fig. 9 is a similar view of the higher order tens carry mechanism, with the top plate removed.

Fig. 10 is a left hand elevation of the same, with the casing broken away.

Fig. 11 is a detail plan view of the higher order carry cam shaft.

Fig. 12 is a detail elevation of a tens carry cam located intermediately of the lower order and higher order tens carry mechanisms.

Fig. 13 is a detail perspective view of the fixed pins for holding the trigger tripped in the two extreme left hand carriage positions.

Registering mechanism

According to the known construction, amounts set up on the differential actuating gears 5 (Fig. 3), by means of keys 18 and setting bails 19, are registered upon the numeral wheels 13, upon rotation of the actuator shaft 4 and shaft 154, upon which the tens carry members 17 are mounted. Shafts 4 and 154 are connected with electric motor and with hand crank driving devices through a train of gearing 74, which is adapted for forward or reverse rotation to register additively or subtractively on the wheels 13. The usual hand crank 3 (Fig. 1) may be provided, but characteristically the machine is operated by an electric motor, having connection through differential gear clutch and reversing mechanism with shaft 154. The rotations of shafts 4 and 154 constituting the operative cycles of the machine, are registered upon multiplier-quotient wheels 85, in the usual manner.

The numeral wheels 13 and 85 are mounted in a transversely shiftable carriage 2, utilized in multiplication and division in the well known manner, said carriage having its movements controlled in these operations by means later described.

In single order operations, registration is controlled by a plus bar 120 and minus bar 121 (Fig. 2), having link connections 123 with a rock shaft 125 extending across the machine and provided with a setting plate 128 (Fig. 5) having spaced shoulders adapted to engage a pin 130 in reversing clutch lever 111, fulcrumed on the frame at 112. Depression of plus bar 120 will rock shaft 125 in a clockwise direction as viewed in Fig. 2 (counter-clockwise, Fig. 5), setting the lever 111 from neutral position into adding position, in which a hook arm 114 of said lever will engage with a lug upon gear 105, forming one leg of the differential drive. Normally the gearing comprising both working legs of the differential will rotate idly, as described in Patent 1,566,650, interruption of the movement of one leg causing the planet gears to move in their orbit in one direction and interruption of the movement of the other leg causing a movement in the opposite direction. Depression of the minus bar 121 will effect opposite rocking movement of the members 125, 128 and 111, to bring a hook arm 113 of lever 111 into engagement with a stop 110 for the other leg of the differential, whereby the drive of shaft 154 will be effected in the reverse direction.

Upon manual release of plus bar 120 or minus bar 121 the parts will be brought to rest in full cycle position as follows:

Setting plate 128 is provided with opposed cam faces, operating in the depression of either bar, through a roller 133 to depress the rear end of a lever 134. This movement of lever 134 carries a pawl 136, mounted upon said lever into position beneath a trigger 31 normally engaging a pawl 25 mounted upon a stop arm 24, and serving to hold said pawl inactive. Upon release of the key, suitable springs will return lever 134 to normal position, causing pawl 136 to raise trigger 31 and release pawl 25, the latter dropping into position behind a shoulder 27 of rock arm 22, connected to shaft 4 by crank 20 and link 21. This connects the arms 22 and 24 to operate in unison, the latter arm being carried against a fixed stop 29, to prevent further rotation of the parts in the original direction. Upon the rebound of the parts from stop 29, a lug of pawl 25 will engage with the end of trigger 31 and lift said pawl out of engagement with shoulder 27. A locator cam, such as that described in Patent 1,566,650 and designated therein as 153 is attached to one of the driven shafts, and serves to locate the parts accurately in their position of rest.

In the movement of arm 24 against stop 29 a rearward extension 144 of said arm will engage a pin 145 of reversing clutch lever 111 and, through the action of one or the other of two opposed cam faces of said extension will move said lever to its central or neutral position. Lever 111, in moving to either of the active positions, is adapted to close the contacts of a circuit breaker, interposed in the motor circuit, by means of an arm 200 (Fig. 4).

*Setting up the factors*

In performing multiplication, the carriage 2 is moved to the left, preferably into its extreme left hand position, wherein the right hand numeral wheel 13 will be in line with the right hand column of keys 18. The multiplier is then set up on the right hand columns of the keyboard, and the plus bar 120 is touched, transferring said multiplier to the right hand wheels 13. The carriage 2 is then moved to the right until the highest order of the multiplier registered upon wheels 13 is located two spaces to the right of the right hand key column 18, that is to say opposite the arrow marked on the keyboard plate. This brings the highest order wheel of the multiplier into position to control the registration of the first partial product. The multiplier is now removed from the keyboard by depression of the usual clear key, and the multiplicand is set up in the keyboard usually in the right hand columns thereof. The multiplication lever 240 is then pushed rearward, whereupon the machine will automatically compute and register the product.

*Multiplier mechanism*

Lever 240 serves to set two distinct mechanisms into operative position, one of these mechanisms comprising a lever 201 and devices controlled thereby, said lever extending through the keyboard plate and being operable independently of the multiplier mechanism, to effect automatic division. The second mechanism set by lever 240 is used only in multiplication operations and remains in inactive position when division lever 201 is set.

Lever 240 (Fig. 2) is provided with a link 241 having pin and slot engagement with an arm 242 of a rock shaft 243, extending across the machine and having a second crank arm 244 (Fig. 4) connected with a link 245, engaging a pin 205 of lever 201. Thus, upon rearward movement of lever 240, lever 201 will be simultaneously moved to rearward position.

Lever 201, which is fulcrumed to the frame at 202, (Fig. 6) in moving to rearward position, will bring pin 205 into engagement with a click pawl 319, mounted upon the forward end of an arm 208, which arm is pivoted upon the fulcrum 112 of reversing clutch lever 111. In this movement, pin 205 will rock the arm 208, a projection in the rearward end of said arm acting upon lever 111 to bring the hook arm 113 of said lever into engagement with the subtraction member 110 of the differential gear train, thus setting the machine in operation subtractively. Pin 205 passes entirely beyond pawl 319, in this movement, leaving lever 111 free to be adjusted from one to another of its three positions.

Upon the completion of the product registration in each denominational order, the registration in this order is terminated, register carriage 2 is shifted to the left and the registration in the next lower order is initiated by means of the full cycle stopping devices above-described and additional devices for modifying the action of the stopping devices, all of these means, having been set into active position, being controlled in their operation through the trigger 31. In multiplication, the first operation of trigger 31 will occur immediately after the machine is put in motion, and will serve to reverse the direction of rotation, before any subtractive registration has been made, this being effected by the multiplier devices on the right hand side of the machine (Fig. 2), as follows: Rearward movement of lever 240, that is to say clockwise movement about its fulcrum 246, as seen in Fig. 2, through cam face 247 of link 241 and roller 248 of slide frame 249, will lift said frame, allowing the same to be latched in raised position by a spring latch member 250. A tripping lever 251 is fulcrumed at 252 upon the frame 249, said lever having a pawl 253 pivoted thereon, said pawl lying normally out of the path of movement of a pin 254 mounted on one of the gears 74. When frame 249 is latched in raised position, however, pawl 253 is brought into position to be engaged by pin 254 and, the movement of this pin being counter-clockwise, as seen in Fig. 2, during subtractive rotation of the parts, the pin will force pawl 253 toward the rear, thus, through arm 255, rocking a shaft 256, extending across the machine, and having a second arm 257 (Fig. 5) engaging the rear end of trigger 31, and acting to trip the pawl 25. Arm 24 will now be carried against stop 29, as previously described, lever 111 brought to unclutching position and pawl 25 again engaged with the end of trigger 31. In addition to this, however, the setting of lever 201 has adjusted certain control devices into position to effect the reclutching of lever 111 in its reverse operating position, that is to say, in this case, hook arm 114 will be engaged and the machine will be started in additive operation. For this purpose a finger 209 (Fig. 6) is pivotally connected to the reversing clutch lever 111, being normally held in inactive position by a suitable spring. As lever 201 is moved to active position, arm 208 will contact with finger 209 and will rock the same counter-clockwise about its pivot, as seen in Fig. 6, until it is caught and held in active position by latch 213. In this position finger 209 is so adjusted that whenever lever 111 is brought into its neutral position, the upper end of said finger will lie in the path of movement of a crank pin 220 carried by the shaft 154, pin 220 thus acting to throw the lever 111 into additive or into subtractive position, according to the direction of rotation of shaft 154.

Additive rotation having been initiated, the operation will be continued for a number of cycles corresponding to the figure of the highest order of the multiplier, registered upon the right hand wheels 13, the product being accumulated in the left hand wheels 13 by repeated addition of the keyboard setting. A registration is terminated in this denominational order at the correct time by the following means:

A counting finger 258 (Fig. 2) is adapted to be rocked by a crank connection 259 about a pin 260, secured in the frame 249, the rearward end of counting lever 258 being moved into cooperating position with the gear attached to the numeral wheel 13 standing opposite the arrow (Fig. 1). The movement of lever 258 is such that during each additive cycle of operation, the related wheel 13 will be rotated subtractively one figure space. Thus, the wheel in question will be rotated backwardly, step by step, until it is brought back to zero registering position, at which time the tens carry pin of this wheel will contact with trip lever 251 and displace the same, to rock the shaft 256 and trip the trigger 31.

Arm 24 of the stopping mechanism will now be brought against stop 29, and during this movement the carriage shifting mechanism will be operated, to move the register carriage 2 one step to the left. This is effected as follows:

The carriage is adapted to be shifted by rotation of a shaft 46 (Figs. 7 and 8) provided with crank pin 64 engaging serrations in the lower forward edge of the carriage. When the machine is set for automatic plural order operation, by means of lever 201, an operating cam 60 is shifted longitudinally of the shaft, by means of bar 217 and yoke 65, bringing a clutch hub 61 of said cam into engagement with a cooperating clutch member 63, fast to shaft 46. Cam 60 is operated upon movement of arm 24, following an additive operation, as follows:

Push rod 47 (Figs. 4 and 5) is intermediately pivoted upon arm 24, the rear end of said rod being adapted for engagement by a stud 50 of the link 21. At the end of an additive operation, crank arm 20, rotating counter-clockwise, as seen in Fig. 6, will be carried downwardly, through its dead center position, before the arm 24 engages stop 29, this movement bringing stud 50 against the end of push rod 47 and acting to hold the forward end of said rod upward, in contact with a stud 51 of a hook arm 261. At the same time the forward movement of arm 24 will carry arm 261 forwardly about its pivot 53. It will be noted that where the movement of arm 24 follows a subtractive operation, the crank 20 will sweep upwardly through dead center position, and push rod 47 will be free to pass under stud 51. A lever 52 is adapted to be connected with arm 261 by means of a member 262 carried by lever 52 and adapted to engage beneath the hook of arm 261 when lever 201 is set to active position. For this purpose a plate 263 is pivoted at 53, normally held in raised position by engagement of the pin 205 of lever 201 with a rearward seat of the plate as seen in Fig. 4, movement of lever 201 to active position bringing pin 205 into contact with a forward seat of said plate, adapted to permit the plate to drop into its lower position. The member 262 has a lug 264 engaging plate 263, so that as said plate drops to its lower position, member 262 is rocked rearwardly by a suitable spring, into contact with the hook of arm 261. The parts 261, 262 and 52 acting as a unit, movement will be transmitted from push rod 47, through a link 57 to a lever 55, (Fig. 7) having a roller adapted to operate cam 60 and rotate shaft 46. Shaft 46 is given a half rotation by cam 60 and by the fall of the carriage into shifted position.

The carriage having been shifted, it will be obvious from the previous description that the parts, moving back from position of contact between arm 24 and stop 29 will cause contact of pin 220 and finger 209 to throw the lever 111 into reverse clutching position this being now the position for engagement of hook arm 113 with subtracting member 110, causing subtractive rotation of the parts. However, it will be remembered, pawl 253 is still in position to be engaged by pin 254, so that this subtractive rotation will immediately be reversed and the machine will be started in addition, to compute the second figure of the multiplier.

In case the second figure of the multiplier is a naught, tripping lever 251 will be engaged by the tens carry pin of the related numeral wheel as the carriage comes into shifted position, and will be held in rocked position, holding trigger 31 tripped, so long as the carriage remains in this position. Therefore, the carriage shift having been completed, and the parts thrown into subtraction and again reversed into addition, arm 24 will still be coupled to arm 22 by pawl 25, and a second carriage shift will occur, no registration having taken place either on the wheels 13 or 85.

These operations will be continued, until register carriage 2 has been shifted so far to the left as to bring the numeral wheels 13 out of register with the multiplier controlling mechanism. Thus the two right hand ordinal positions of the carriage are used in division operations, but are idle in registering a product. The means for finally stopping the machine and restoring the parts to normal at the end of a division operation, however, are utilized also in multiplication. Therefore, in order to insure the stepping over of the carriage and the restoration of the parts without any registering operation in these last two places, when a product is being registered, two pins 265 (Fig. 13) are fixed upon the supporting shaft of numeral wheels 13, said pins lying to the right of the series of numeral wheels in continuation of the series of tens carry pins, being angularly positioned to correspond with the zero location of such carry pins. Thus in these two left hand positions of the carriage the pins 265 will hold the tripping lever 251 in operated position, so that arm 24 will remain coupled to arm 22. In the next to the last place, this effects a shifting of the carriage 2 in the same manner described for a naught multiplier figure. In the last place the pin 265 permits the operation of the restoring devices above-mentioned, but prevents a registering operation, by the following means:

A lug 198 (Fig. 6) is provided on the carriage 2, said lug being adapted as the carriage is seated in last place position to depress a lever 223, having pin and slot connection with a link 311, pivoted upon the division lever 201, this movement carrying a shoulder of said link into the path of movement of an arm 314 pivoted upon the stud 112 and engaged by the roller 50 of link 21. When the carriage arrives in the last place position, the parts are in rotation in a subtractive direction, shaft 154 being rotated clockwise as seen in Fig. 6, until the arm 24 is carried against the stop 29. During this movement, stud 50 will, through arm 314 and link 311 restore lever 201 to inactive position, this movement also serving, through link 245 and shaft 243 to restore the multiplier lever 240 to normal position.

After the contact of arm 24 with stop 29 the parts will rebound and the clutch will be thrown into additive position. This movement of the clutch will bring the latch 213 of the reversing finger 209 against the pin 205 of division lever 201, and will trip the latch and allow the reversing finger to be restored to inactive position, so that the parts will operate to stop the machine in full cycle position, as described above in connection with single order operation. During the final movement of the parts in an additive direction, toward stop 29, means will be operated for tripping the latch 250 and thus restoring the multiplier control mechanism to normal inactive position. This mechanism comprises a lever 266 (Fig. 2) pivoted upon the arm 242, and having engagement with the latch 250. When arm 242 is rocked forwardly, upon setting of the division lever 201 or multiplier lever 240 to active position, lever 266 is moved into an idle position. Upon restoration of these parts, however, lever 266 will be moved rearwardly, bringing one end thereof in contact with the latch 250 and the other end into the path of movement of the pin 254, mounted as above-explained on one of the gears 74. Pin 254, moving clockwise from its full cycle position, illustrated in Fig. 2, will thereupon contact with lever 266 and move latch 250 rearwardly, allowing frame 249 to drop and bringing the parts supported by said frame into inactive position.

Extended tens carry

Owing to the fact that the multiplication is begun in the highest order of the multiplier, and proceeds by shifting the numeral wheel carriage 2 to the left, it will occasionally be necessary to carry tens in the product up to numeral wheels 13 located a considerable distance to the left of the keyboard, and provision is therefore made for carrying the tens up to the highest order wheel 13 in any position of the carriage 2.

The tens carry members 17 related to the denominational orders lying opposite to the keyboard mechanism consist of two series of teeth, arranged in oppositely pitched spirals about carry shaft 154, these two series providing for tens carry in addition and in subtraction, in the well known manner. The teeth 17 are of the preset subsequently operated type, while to the left of the keyboard a series of gears 267 are provided, operable by the tens carry pins on the numeral wheels and serving to transmit a tens carry to the next higher wheels 13 by a direct gearing connection. Theoretically, this provides for a simultaneous tens carry between the higher order wheels, but actually, where a carry is to be effected from one to the other of a number of wheels, there will be so much accumulated lost motion in the gearing that the higher order wheels will not be rotated at all. Therefore, cams 268 and 269 (Figs. 10 and 12) are provided, acting successively from right to left, to force pivoted teeth 270 and 271 between the teeth of gears 267 to move said gears into full step position, and thereby to complete the carrying operation to the higher order wheels.

These successively acting cams 268 and 269, used in addition to successively acting carry teeth 17, lead to the occurrence of a greater number of spaced actions during each cycle of operation of the machine. Means are provided in accordance with the disclosure of Patent 1,845,863, whereby the action of the cams 269 may be delayed until after the actuators have passed through their normal position of rest, and whereby this action of the cams will occur during the time that the carry teeth 17 not being used are moved idly past their operated gears.

For this purpose, the cams 269 are mounted upon a shaft 272 (Fig. 11), aligned with carry shaft 154 and having a lost motion connection with said shaft, comprising a slotted crank arm 273 (Fig. 9), engaged by a pin in crank arm 20. Thus the cams 269 are adjusted with relation to shaft 154 in accordance with the direction of rotation of said shaft, and said cams will operate in the manner described either in additive or subtractive registrations. A spring 274 (Fig. 11) holds shaft 272 under sufficient friction to prevent the same from rotating, upon reversal of shaft 154, until the readjustment has taken place. The first carry gear 267 is opposite the shaft 154, as seen in Fig. 9, and the cam 268 operating the tooth 270 corresponding to this gear is therefore mounted upon shaft 154. Cam 268 operates tooth 270 just as the parts arrive in their normal position of rest, as illustrated in Fig. 12.

In division operations, trigger 31 is tripped by action of the tens carry pin of the numeral wheel 13 of highest order, this action, through the cooperation of the control mechanisms set by division lever 201, providing for the performance of division operations automatically. The carry pin of the highest order wheel, when the carriage 2 is in extreme right hand position, will engage directly with trigger 31, while in the leftward shifted positions of the carriage the pin will engage one of a series of arms 275 (Fig. 9), mounted upon a shaft 276, said shaft being provided also with a terminal arm 277 overlying trigger 31, as shown in Fig. 5. In addition to the function of this tripping mechanism in division, it also serves to indicate an accumulation on numeral wheels 13 beyond the capacity of the machine in any operation.

Means are provided for automatically clearing the registration of $l$ from a wheel of the multiplier register 85, when said registration has been made during the cycle of operation required to transfer the multiplier from keys 18 to the wheels 13. The counting finger, of known construction, operates upon the wheel 85 standing in line with the right hand row of keys 18, and it will be observed that after a multiplier has been set up and the carriage 2 shifted to multiplying position, the entire multiplication will be performed with the wheel 85 in question lying to the right of its actuated position. Therefore, this wheel 85 will be brought, during the multiplying operation, opposite the position of tripping lever 251. Said tripping lever is provided with a lug 278 which, when frame 249 is latched in raised position, will hold a cam arm 279 in elevated position. When the carriage is shifted to the left and the wheel 85 standing at $l$ comes opposite the position indicated by the arrow in Fig. 1, a pin on this wheel will contact with cam arm 279, and the wheel will be cammed backward into zero registering position.

Multiplying by a product

One of the advantages of the invention lies in the simplicity with which problems involving A×B×C may be performed. Where these problems involve factors of only a few figures, the entire multiplication may be performed by the automatic multiplication method above-described. The first multiplication having been completed the product will appear in the wheels 13, and it is then only necessary to move carriage 2 to the right until the first figure of this product is positioned opposite the arrow of Fig. 1, in which position it may serve as the multiplier in the second operation. Problems having factors extending to a greater number of figures may advantageously be performed by the combined use of the plus and minus bars and of the multiplier lever, the first multiplication being performed by multiplying first by the lower order figures of the multiplier, and by shifting the carriage toward the right. Either the repeated addition method, or the well known short cutting method of multiplication may be used, the latter involving alternate operation of the plus and minus bars. At the completion of this first operation the product will appear in the right hand wheels 13, so that the machine will have a greater capacity if this registration is to be used as a multiplier for a second operation.

I claim:

1. In a calculating machine, the combination with a denominationally shiftable carriage, wheels thereon adapted to register a product, and means for effecting a plural order registration including means for arresting the registration in any given denominational order; of control means adjustable to active position and including devices operable to reduce a prior registration upon one of said product register wheels and devices operable upon movement of said wheel from one to zero registering position to effect operation of the arresting means.

2. In a calculating machine, the combination with a denominationally shiftable carriage, wheels thereon adapted to register a product, and means for effecting a plural order registration including means for arresting the registration in any given denominational order and a trigger normally holding the arresting means inactive; of control means adjustable to active position of cooperation with certain of said product wheels displaying a prior registration and adapted when the related one of said product register wheels stands in zero registering position to hold the trigger in tripped condition.

3. In a calculating machine, the combination with a denominationally shiftable carriage and wheels thereon adapted to register a product; of means for effecting a plural order registration including means adjustable to active position and operable during additive registration upon certain product wheels to reset another of said product register wheels subtractively, step by step, from a prior registering to zero registering position, means cooperating with said reset wheel to arrest the registration in the related denominational order, and means for automatically bringing the machine to rest and restoring the adjustable means to inactive position.

4. In a calculating machine, the combination with a denominationally shiftable carriage and wheels thereon adapted to register a product; of means for effecting a plural order registration including a clutch and means for automatically disengaging and reengaging said clutch, means adjustable to active position and operable during additive registration upon certain product wheels to reset another of said product register wheels subtractively, step by step, from a prior registering to zero registering position, and means cooperating with said reset wheel as it moves subtractively to zero to actuate the clutch disengaging means to arrest the registration in the related denominational order.

5. In a calculating machine, the combination with a denominationally shiftable carriage, wheels thereon adapted to register a product, and reversible actuators for said wheels; of means for effecting a plural order registration including a clutch and simultaneously operable clutch adjusting and actuator reversing mechanism, and clutch and reverse control means including means operable by a product register wheel upon movement thereof from a prior registering to zero registering position, and product determining means adjustable to active position and cooperating with the simultaneously operable mechanism to effect reversal, without registration, upon initiation of a subtractive movement.

AUSTIN A. OVERBURY.